(12) United States Patent
Kikuchi et al.

(10) Patent No.: US 7,387,454 B2
(45) Date of Patent: Jun. 17, 2008

(54) CAMERA

(75) Inventors: Hideyuki Kikuchi, Fujieda (JP);
Shohei Miyatake, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 315 days.

(21) Appl. No.: 11/230,489

(22) Filed: Sep. 21, 2005

(65) Prior Publication Data
US 2006/0062570 A1    Mar. 23, 2006

(30) Foreign Application Priority Data
Sep. 22, 2004    (JP) .............................. 2004-274741

(51) Int. Cl.
*G03B 17/00* (2006.01)
(52) U.S. Cl. ....................... 396/439; 396/448
(58) Field of Classification Search .................. 396/25, 396/439, 448; 348/143
See application file for complete search history.

(56) References Cited
U.S. PATENT DOCUMENTS
7,211,543 B2 *    5/2007    Nakabayashi et al. ...... 502/350

2004/0143373 A1 *    7/2004    Ennis ............................. 701/1
2004/0179099 A1 *    9/2004    Bos et al. .................... 348/148

FOREIGN PATENT DOCUMENTS
JP    9-230493    9/1997
JP    11-308505    11/1999

\* cited by examiner

*Primary Examiner*—Rodney E Fuller
(74) *Attorney, Agent, or Firm*—Oblon, Spivak, McClelland, Maier & Neustadt, P.C.

(57) ABSTRACT

In the camera 10 having an ultraviolet light generating portion 16, the influence of the ultraviolet light upon an image to be taken is suppressed. A camera 10 for taking an image possesses an image-pickup portion 24 which takes an image of a subject;
a hydrophilic filter 14 formed so that a hydrophilic surface is exposed on an outer surface of the camera, and transmitting a light entering from the subject to said image-pickup portion; and
an ultraviolet light generating portion 16, which irradiates an ultraviolet light with the surface of the external surface of said camera on said hydrophilic filter from the edge portion of said hydrophilic filter. The hydrophilic filter 14 comprises a photocatalytic substance which decomposes organic substances adhered thereon depending on the ultraviolet light.

14 Claims, 7 Drawing Sheets

CAMERA

CROSS REFERENCE TO RELATED

The present application claims priority under 35 U.S.C. §119 of Japanese Patent Application No. 2004-274741, filed on Sep. 22, 2004, entitled "CAMERA". The contents of that application are incorporated herein by reference in their entirety.

BACKGROUND ART

1. Field of the Invention

The present invention relates to a camera.

2. Description of the Related Arts

It has hitherto to been known in a camera having a photocatalytic layer formed on the surface of the lens to possess a configuration that a light source for irradiating a ultraviolet light (See, for example, Japanese Patent Laid-Open No. 9-230493). Also, it has been known that in order to irradiate a light to the photocatalytic layer with no influence upon an image to be taken, a light source is configured to be provided on a portion later than the lens (% See, for example, Japanese Patent Laid-Open 11-308505).

In the configuration disclosed in Japanese Patent Laid-Open No. 9-230493, a cover case for the camera has an arm, and the light source is fitted to the tip of the arm. However, in such a configuration, the ultraviolet light is irradiated from substantially front side of the lens and, thus, it is easy to transmit the lens, which has adversely influence an image to be taken by the camera.

In the case where the light source is provided behind the lens as in the configuration disclosed in Japanese Patent Laid-Open 11-308505, the ultraviolet light transmitting through the lens is unduly leaked out of the camera. If the leaked ultraviolet light is irradiated with resin, paint, and the like around the camera, the resin, paint and the like are sometimes deteriorated. Consequently, the leakage of the ultraviolet light is not preferred.

An object of the present invention is, therefore, to provide a camera which can solve the problems associated with the prior arts.

SUMMARY OF THE INVENTION

The present invention has the following configurations.

(Configuration 1) A camera for taking an image possessing: an image-pickup portion which takes an image of a subject; a hydrophilic filter which is formed so that a hydrophilic surface is exposed on an outer surface of said camera, and which transmits a light entering from the subject to said image-pickup portion; and a ultraviolet light generating portion, which irradiates an ultraviolet light to the surface of the external surface of said camera on said hydrophilic filter from the edge portion of said hydrophilic filter; and said hydrophilic filter comprising a photocatalytic substance which decomposes organic substances adhered thereon due to the ultraviolet light.

According to this configuration, even if the camera is used under environments where the sunlight is difficult to be exposed, the hydrophilic filter can be kept clean. Also, in this configuration, the ultraviolet light enters into the surface of the hydrophilic filter at a thin angle. Consequently, this configuration can suppress the influence of the irradiated ultraviolet light upon an image taken by the camera. Also, this configuration can suppress the leakage of the ultraviolet light out of the camera. The hydrophilic filter is formed, for example, on the surface of the lens of the camera or hood glass (cover glass) of the lens.

(Configuration 2) The ultraviolet light generating portion may possess a light emitting diode.

The light emitting light has a longer service life than that of light sources such as bulb. For this reason, such a configuration elongates the service life of the ultraviolet light generating portion, making it possible to provide a highly reliable camera. Also, the light emitting diode, which is small, enhance freedom of designing the ultraviolet light generating portion 16 and the camera 10 and can also enhance possibility of designing the camera 10. Moreover, the light emitting diode, which can rapidly switching on and switching off, can enhance the freedom of controlling lightening of the ultraviolet light generating portion 16. For example, when the image pickup portion takes a moving picture, the light emitting diode may irradiate the ultraviolet light at the time between the frames of the moving picture. Such a configuration can further suppress the influence of the ultraviolet light upon the image.

The ultraviolet light generating portion may have a plurality of light emitting diodes. In this case, part of light emitting diode(s) may continuously irradiate the ultraviolet light, and others may discontinuously irradiate the ultraviolet light. For example, the light emitting diode(s) for irradiating the ultraviolet to heavily stained portion may continuously irradiate ultraviolet light, and the light emitting diode(s) for irradiating the ultraviolet to portions which are not so stained, may discontinuously irradiate the ultraviolet light. Also, for example, the light emitting diode(s) for irradiating the ultraviolet around the center of the hydrophilic filter may continuously irradiate the ultraviolet light, and the light emitting diode(s) for irradiating the ultraviolet around the edge of the hydrophilic filter may discontinuously irradiate the ultraviolet light. In this configuration, even if the light source having a long service life such as the light emitting diode is used, the deterioration of other parts making up the camera can be suppressed.

(Configuration 3) The ultraviolet light generating portion further possesses a reflecting mirror provided along at least edge portion of said hydrophilic filter, and the reflecting mirror reflects the ultraviolet light from said light emitting diode to irradiate the ultraviolet light to said hydrophilic filter.

In the case of using the reflecting mirror, designing the light orientation can be made at a much higher accuracy in comparison with direct control of the irradiation direction of the light emitting diode. Consequently, such a configuration can control their radiation direction of ultraviolet light at a much higher accuracy in comparison, for example, in comparison with the case where the ultraviolet light from the light emitting diode is directly irradiated to the hydrophilic filter.

(Configuration 4) The ultraviolet light generating portion may further possess an external circumferential member made of a transparent material provided at least along the edge portion of said hydrophilic filter, the reflecting mirror irradiates the ultraviolet light to said hydrophilic filter via said external circumferential member, and the portion exposed of the surface of external circumferential member on the edge portion of said hydrophilic filter at the outer surface is made hydrophilic.

Such a configuration can prevent the residence of water droplets at the edge portion of the hydrophilic filter.

(Configuration 5) The 1 light emitting diode may comprise a mold portion at least partially exposed on the edge portion of said hydrophilic filter, and the portion of the surface of the mold portion exposed to the edge portion of said hydrophilic filter is made hydrophilic.

Such a configuration can prevent the residence of water droplets at the edge portion of the hydrophilic filter.

(Configuration 6) A camera for taking an image possessing:
a image-pickup portion which takes an image of a subject;
a hydrophilic filter which is formed so that a hydrophilic surface is exposed on an outer surface of said camera, and which transmits a light entering from the subject to said image-pickup portion; a cover for covering said hydrophilic filter from the external surface side of said camera, when said image-pickup portion does not take an image, and
a ultraviolet light generating portion which is provided at a surface facing said hydrophilic filter of said cover, and which irradiates a ultraviolet light towards the external surface side of said camera when said cover covers said hydrophilic filter; and said hydrophilic filter comprises a photocatalytic substance decomposing organic substances adhered thereon due to the ultraviolet light.

According to this configuration, even if the camera is used under environments where sunlight is difficult to be exposed, the hydrophilic filter can be kept clean. Also, in this configuration, the ultraviolet light is irradiated when the image-pickup portion does not take an image. Consequently, this configuration can suppress the influence of the irradiated ultraviolet light upon an image taken by the camera. Also, this configuration can suppress the leakage of the ultraviolet light out of the camera. The hydrophilic filter is formed, for example, on the surface of the lens of the camera or hood glass (cover glass) of the lens.

(Configuration 7) The camera may be provided on a vehicle, and the hydrophilic filter upon stopping the engine of said vehicle, and said ultraviolet light generating portion generates an ultraviolet light for a prescribed period of time upon covering the said hydrophilic filter with said cover.

According to this configuration, the organic substances adhered on the hydrophilic filter can be decomposed every use of the camera.

(Configuration 8) A vehicle rear side camera comprising the camera according to claim 1 provided so that said hydrophilic filter is directed downward.

In many cases, the vehicle rear side camera is provided downward from the camera fitting position in order to secure the rear field of the vision, and it is provided downward at most at approximately 90 degree. Consequently, depending upon the camera fitting angle, the irradiation amount of the ultraviolet is insufficient only from sunlight so that photocatalytic function of the hydrophilic filter is considered to be sufficiently exhibited in some cases. Consequently, the inventors measured the strength of the ultraviolet at the time of fine weather and at the time of cloudy weather.

TABLE 1

| | 8:55-9:00 | 9:55-10:00 | 10:55-11:00 | 11:55-12:00 | 12:55-13:00 | 13:55-14:00 | 14:55-15:00 | 15:55-16:00 |
|---|---|---|---|---|---|---|---|---|
| Weather | Fine | Fine | Fine | Fine | Fine | Fine | Fine | Fine |
| Direct the sun | 1.472 | 2.410 | 2.670 | 2.600 | 2.370 | 1.902 | 0.910 | 0.152 |
| Backward the sky | 0.560 | 0.682 | 0.783 | 0.845 | 0.698 | 0.601 | 0.465 | 0.125 |
| Toward the Sun | | | | | | | | |
| 0 Deg. | 1.200 | 1.590 | 1.792 | 1.690 | 1.830 | 1.310 | 0.756 | 0.108 |
| 45 Deg. | 0.180 | 0.361 | 0.491 | 0.242 | 0.683 | 0.609 | 0.368 | 0.051 |
| 90 Deg. | 0.065 | 0.118 | 0.119 | 0.109 | 0.139 | 0.101 | 0.052 | 0.014 |
| Back the Sun | | | | | | | | |
| 0 Deg. | 0.305 | 0.409 | 0.554 | 0.458 | 0.683 | 0.441 | 0.282 | 0.088 |
| 45 Deg. | 0.093 | 0.156 | 0.270 | 0.210 | 0.213 | 0.196 | 0.109 | 0.027 |
| 90 Deg. | 0.066 | 0.129 | 0.119 | 0.118 | 0.138 | 0.095 | 0.056 | 0.014 |
| Cross the Sun | | | | | | | | |
| 0 Deg. | 0.454 | 0.854 | 0.549 | 0.604 | 0.580 | 0.464 | 0.295 | 0.102 |
| 45 Deg. | 0.098 | 0.165 | 0.274 | 0.222 | 0.281 | 0.196 | 0.143 | 0.038 |
| 90 Deg. | 0.077 | 0.124 | 0.151 | 0.151 | 0.154 | 0.103 | 0.054 | 0.014 |

TABLE 2

| | 8:55-9:00 | 9:55-10:00 | 10:55-11:00 | 11:55-12:00 | 12:55-13:00 | 13:55-14:00 | 14:55-15:00 | 15:55-16:00 |
|---|---|---|---|---|---|---|---|---|
| Weather | Cloudy | Cloudy | Cloudy/Fine | Fine | Cloudy | Cloudy | Fine | Fine |
| Direct the sun | 0.876 | 0.858 | 1.635 | 2.540 | 1.156 | 0.685 | 0.842 | 0.170 |
| BackWard the sky | 0.554 | 0.742 | 0.836 | 0.800 | 0.658 | 0.577 | 0.455 | 0.147 |
| Toward the Sun | | | | | | | | |
| 0 Deg. | 0.502 | 0.470 | 1.001 | 1.650 | 0.533 | 0.333 | 0.627 | 0.120 |
| 45 Deg. | 0.096 | 0.169 | 0.202 | 0.235 | 0.101 | 0.138 | 0.160 | 0.029 |
| 90 Deg. | 0.058 | 0.072 | 0.071 | 0.120 | 0.076 | 0.052 | 0.050 | 0.014 |

TABLE 2-continued

|  | Time | | | | | | | |
|---|---|---|---|---|---|---|---|---|
|  | 8:55-9:00 | 9:55-10:00 | 10:55-11:00 | 11:55-12:00 | 12:55-13:00 | 13:55-14:00 | 14:55-15:00 | 15:55-16:00 |
| Back the Sun | | | | | | | | |
| 0 Deg. | 0.330 | 0.442 | 0.520 | 0.552 | 0.445 | 0.269 | 0.311 | 0.106 |
| 45 Deg. | 0.133 | 0.149 | 0.199 | 0.276 | 0.242 | 0.097 | 0.127 | 0.039 |
| 90 Deg. | 0.060 | 0.070 | 0.072 | 0.128 | 0.072 | 0.048 | 0.051 | 0.014 |
| Cross the Sun | | | | | | | | |
| 0 Deg. | 0.330 | 0.428 | 0.522 | 0.761 | 0.455 | 0.365 | 0.315 | 0.094 |
| 45 Deg. | 0.102 | 0.158 | 0.210 | 0.287 | 0.138 | 0.112 | 0.101 | 0.034 |
| 90 Deg. | 0.056 | 0.072 | 0.081 | 0.137 | 0.065 | 0.048 | 0.052 | 0.015 |

Tables 1 and 2 show the results of measuring the ultraviolet strength, respectively. The unit of the ultraviolet strength is mW/cm$^2$. The measurements are performed at Fujieda-shi, Shizuoka on December 2003 for cameras fitted at various angles utilizing UVR-1 available from TOPCON Co., Ltd. As a ultraviolet strength meter for every one hours. As a light receiver for the ultraviolet strength meter, UD36 was used. Considering the vehicle rear side camera, each of the cameras was fitted at the height of 190 cm.

In Tables 1 and 2, the term direct the sun means the direction of the camera that light receiving surface of the light receiver of the ultraviolet strength meter and the direction of the sun are perpendicular to each other. The term "backward the sky" means the direction of the camera at the same angle as that of the direct the sun where the camera is directed toward the back of the sun.

The "toward sunlight", "backward the sun" and "sideway the sun" mean the horizontal components of the camera direction, wherein "toward the sun" means the direction of the camera directed toward the sun, "backward the sun" means the direction of the camera directed backward the sun, and the "sideway the sun" means the camera is directed sideway the sun. The "toward the sun", "backward the sun" and "sideway the sun" were measured at the angle of the camera fitting angles at 0 degree (horizontal), 45 degree, and 90 degree (just under the sun).

It has been understood from these experimental data, even if the direction of the camera is toward the sun at the time of fine weather that the ultraviolet strength of the sunlight is the strongest, the ultraviolet strength become approximately 0.1 mW/cm$^2$ when the camera fitting under is backward the sun (just under the sun), in which case the ultraviolet strength is weaken from approximately 1/10 to 1/20 the direct the sun. The weaken ultraviolet strength as described above is not sufficient for exhibiting photocatalytic functions.

According to the configuration of the present invention utilizing the ultraviolet light generating portion, sufficient photocatalytic functions can be exhibited to the hydrophilic filter. Consequently, according to the present invention, even in the vehicle rear side camera which is difficult to expose the sunlight, the organic substances adhered on the hydrophilic filter can be decomposed to always secure the clear view field.

(Configuration 9)

The hydrophilic filter is formed on a substrate, which is one of a transparent substrate or lens for said camera, the substrate is made of a material having a refracting ratio smaller than the layer comprising a photocatalytic substance of said hydrophilic filter, and the said hydrophilic filter further possesses an intermediate layer having a refracting ratio between a layer comprising a photocatalytic substance and said substrate formed between a layer comprising a photocatalytic substance and said substrate.

According to this configuration, the reflecting ratio of the hydrophilic filter can be decreased to suppress the generation of the interference color. The decreasing of the reflecting ratio can also suppress the generation of multi-reflection phenomenon and the generation of the ghost.

According to this configuration, even if the camera is used under environments where sunlight is difficult to be exposed, the hydrophilic filter can be kept clean.

BRIEF DESCRIPTION OF THE DRAWINGS

FIG. 3 is a drawing showing examples of the configuration of a hydrophilic filter 14, wherein

DETAILED DESCRIPTION OF THE INVENTION

Figure 1:
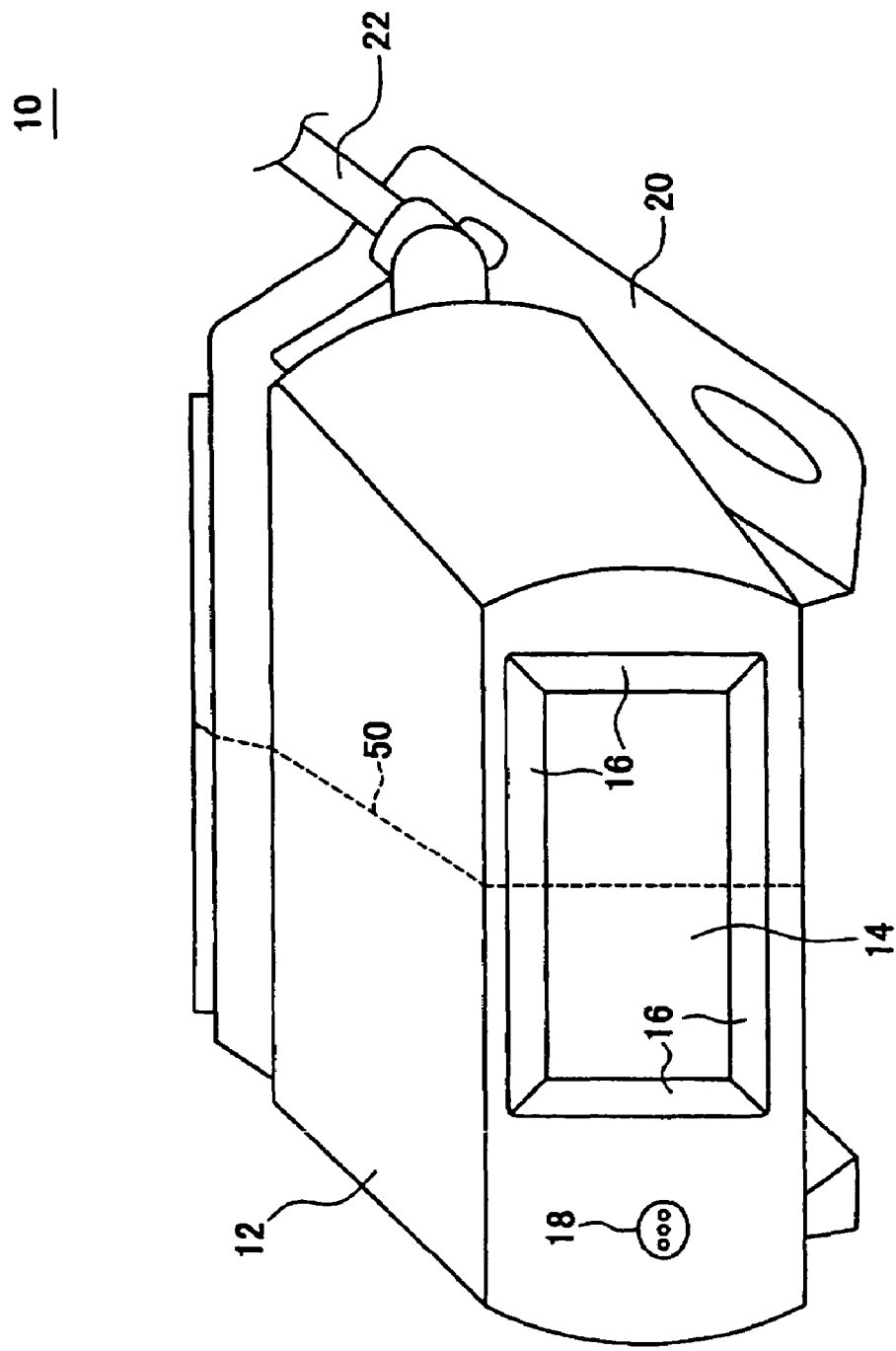
FIG. 1 is a perspective view showing a camera 10 according to a first embodiment of the present invention corresponding to configuration 1 of the present invention.

Embodiments of the present invention will now be described by referring to the drawings.

Figure 2:
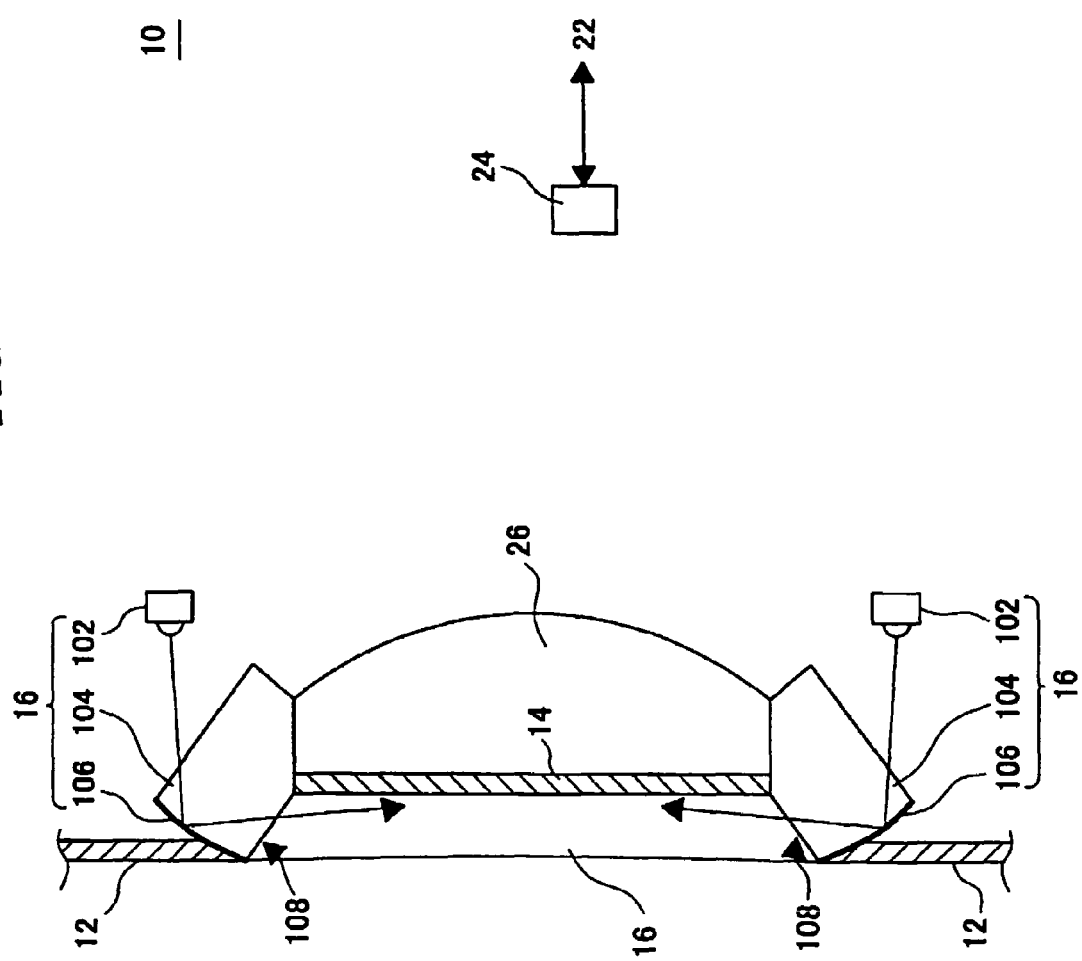
FIG. 2 is a vertically cross-sectional view showing the camera 10.

FIG. 1 and FIG. 2 show one embodiment of a camera 10 corresponding to configuration 1 of the present invention. FIG. 1 is a perspective view of the camera 10. FIG. 2 is a vertically cross-sectional view of the camera 10. The vertical cross-section is a cross-section of dot 50 in FIG. 1.

The camera 10 is a vehicle rear side camera and comprises a cover case 12, a stage 20, a hydrophilic filter 14, a ultraviolet light generating portion 16, a lens 26, a image-pickup portion 24, a microphone 18 and a cable 22. The camera 10 preferably possesses a filter for cutting an ultraviolet between the hydrophilic filter 14 and the image-pickup portion 24. The cover case 12 is a body of the camera 10. The stage 20 is a pedestal for fitting the camera to the body of a vehicle and holds the camera downward. For this reason, the camera 10 has the hydrophilic filter 14 provided downward.

The hydrophilic filter 14 is a filter for preventing fogging of the lens 26, and is formed so that the hydrophilic surface thereof is exposed on the external surface of the camera 10. The hydrophilic filter 14 comprises a photocatalytic substance. The photocatalytic substance decomposes the organic substances adhered on the hydrophilic surface of the hydrophilic filter 14 depending upon the ultraviolet. The hydrophilic filter 14 receives the irradiation of the ultraviolet light from the ultraviolet light generating portion 16. By such a configuration, even if the sunlight is difficult to be irradiated to the hydrophilic filter 14, the hydrophilic filter 14 can be kept cleans. The hydrophilic filter may also receive the ultraviolet light from the sunlight.

The lens 26 is one example of the substrate having the hydrophilic filter 14 formed thereon, and is made of a transparent material. The lens 26 projects an image of the subject above the image-pickup portion 24 via the hydrophilic filter 14 depending on the light entering from the subject. The image-pickup portion 24 is a image-pickup element comprising, for example, CCD picturing element, a CMOS picturing element, or such, and picks up an image of the subject depending upon the light entering from the subject via the hydrophilic filter 14 and the lens 26. The microphone 16 captures circumferential sound. The cable 22 transfers the image picked up by the image pickup portion 24 and the sound captured by the microphone 18 to an portion out of the camera 10.

The ultraviolet light generating portion 16 will now be described in more detail. In this embodiment, the ultraviolet light generating portion 16 possesses a light emitting diode 102, a reflecting mirror 106, and an external circumferential member 104. The light emitting diode 102 is one example of the ultraviolet light emitting element, and generates the ultraviolet light. The reflecting mirror 106 is provided along the edge portion of the hydrophilic filter 14, and irradiates the ultraviolet light to the hydrophilic filter 14 by reflecting the ultraviolet light from the light emitting diode 102. In this embodiment, the reflecting mirror 106 is formed on a part of the surface of the external circumferential member 104, and irradiates the ultraviolet light to the hydrophilic filter 14 via the external circumferential member 104. The ultraviolet light generating portion 16 may have a ultraviolet light source such as a black light instead of the light emitting diode 102.

The external circumferential member 104 is a frame material provided along the edge portion of the hydrophilic filter 14. A portion 108 of the external circumferential member 104 exposed to the edge portion of the hydrophilic filter 14 is made hydrophilic. Such a configuration makes it possible to prevent the residence of water droplets on the edge portion of the hydrophilic filter 14. The external circumferential member 104 is made of a light transmitting material, which transmits the ultraviolet light, and irradiates the ultraviolet light reflected by the reflecting mirror 106 to the hydrophilic filter 14 from the portion 108 exposed to the edge portion of the hydrophilic filter 14. By this configuration, the ultraviolet light generating portion 16 irradiates the ultraviolet light from the edge portion of the hydrophilic filter 14 to the surface of the hydrophilic filter 14.

Here, if the ultraviolet light is irradiated to the hydrophilic filter 14, for example, from the front surface, the ultraviolet light transmits the hydrophilic filter 14 and the lens 26 to reach the image pickup portion. This has a possibility to have adverse influence upon the image to be taken. If the ultraviolet is irradiated to the hydrophilic filter 14 from the backside in contact with the lens 26, the ultraviolet light transmits the hydrophilic filter 14 to be leaked out of the camera 10.

However, in this embodiment, the hydrophilic filter 14 and the lens 26 are both provided on the cover case 12 at a concave position, and the portion 108 of the external circumferential member 104 is exposed on the edge portion of the hydrophilic filter 14 at the position between the cover case 12 and the hydrophilic filter 14. For this reason, the ultraviolet light generating portion 16 irradiates the ultraviolet light to the ultraviolet light generating portion 16 irradiates the ultraviolet to the hydrophilic filter 14 from the edge portion of the hydrophilic filter 14 to the hydrophilic filter 14 at a thin angle. In this case, the ultraviolet light generating portion 16 irradiates the ultraviolet from the outside of the angle of the field of the camera 10 and, thus, the influence of the ultraviolet upon an image to be taken can be suppressed.

Furthermore, the ultraviolet light generating portion 16 irradiates the ultraviolet towards the inside of the camera 10 and, thus, the ultraviolet transmitting through the hydrophilic filter 14 and the lens 26 is never leaked out of the camera. Also, since the hydrophilic filter 14 is provided at the position concaved from the cover case 12, even if parts of the ultraviolet light is reflected at the hydrophilic filter 14, the reflected ultraviolet light encounters the portion 108 of the external circumferential member 104 residing at the facing portion and, thus, the ultraviolet is not leaked. Also, since the ultraviolet light reflected by the hydrophilic filter 14 is not leaked, the ultraviolet light generating portion 16 may irradiate the ultraviolet at an angle that it is totally reflected by the hydrophilic filter 14.

The ultraviolet light generating portion 16 preferably irradiates the ultraviolet over the entire portions of the hydrophilic filter 14 in a uniform manner. Such a configuration can uniformly clean the total of the hydrophilic filter 14. Also, the ultraviolet light generating portion 16 may irradiate the ultraviolet light in such a manner that the strength thereof is maximum at the portion covering the center of the lens 26 at the hydrophilic filter 14. Such a configuration can keep the center portion of the image taken by the image pickup portion 24 much more clear.

The ultraviolet light generating portion 16 may also be provided along a part of the edge portion of the hydrophilic filter 14. In this case, the external circumferential member 104 may be provided, for example, on one side of the hydrophilic filter 14 or along two opposite sides. The elements making up the camera 10 such as cover case 12, the lens 26 and the external circumferential member 104 are preferably made of UV resistant materials. Also, the ultraviolet light generating portion 16 preferably possesses a filter for cutting visible lights such as a filter for cutting a blue light not so as to generate lights other than the ultraviolet light.

The ultraviolet light generating portion 16 may has a light-guide plate. The light guide plate directs the ultraviolet, for example, from the light emitting diode 102 to the reflecting mirror 106. The use of the light guide plate enhance the freedom of the design of the orientation, enhancing the design of the camera 10. The camera 10 may be, for example, a monitor camera provided within a construction such as a house or building or in the open.

Figure 3A:
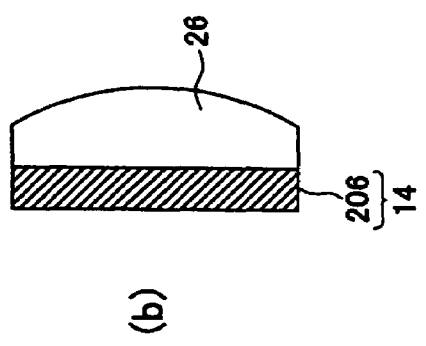
FIG. 3A is a first example of the configuration of the hydrophilic filter 14.

FIG. 3 shows examples of the configuration of the hydrophilic filter, and FIG. 3A shows a first embodiment of the configuration of the hydrophilic filter 14. In this configuration, the hydrophilic filter 14 possesses a photocatalytic layer 204 and the hydrophilic layer 202. The photocatalytic layer 204 is a layer comprising a photocatalytic substance such as $TiO_2$, and is formed on the surface of the lens 26. The hydrophilic layer 202 is a layer formed on the hydrophilic surface of the hydrophilic layer 14, and is formed by a metal oxide such as $SiO_2$ on the photocatalytic layer in a porous state.

In this configuration, the photocatalytic layer 204 decomposes the organic substances adhered on the hydrophilic surface of the hydrophilic filter 14 depending upon the ultraviolet light. Consequently, such a configuration can keep the hydrophilic surface clean, thus, keeping the hydrophilicity on the surface of the lens 26. This can, in turn, keep the anti-fog property of the lens 26.

Figure 3B:
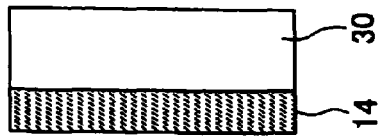

FIG. 3B shows a second embodiment of the configuration of the hydrophilic filter 14. In this configuration, the hydrophilic filter 14 possesses a mixed layer 206. The mixed layer 206 is a layer formed by a mixture of the hydrophilic substance and the photocatalytic substance, and is formed on the lens 26 in a porous state. The hydrophilic substance is for example, $SiO_2$. The photocatalytic substance is for example, $TiO_2$. Also, in this configuration can keep the hydrophilic surface clean, thus, keeping the hydrophilicity on the surface of the lens 26. This can, in turn, keep the anti-fog property of the lens 26. Also, the mixed layer may be formed by a substance both serving as the hydrophilic substance and as the photocatalytic substance such as $TiO_2$.

Figure 3C:
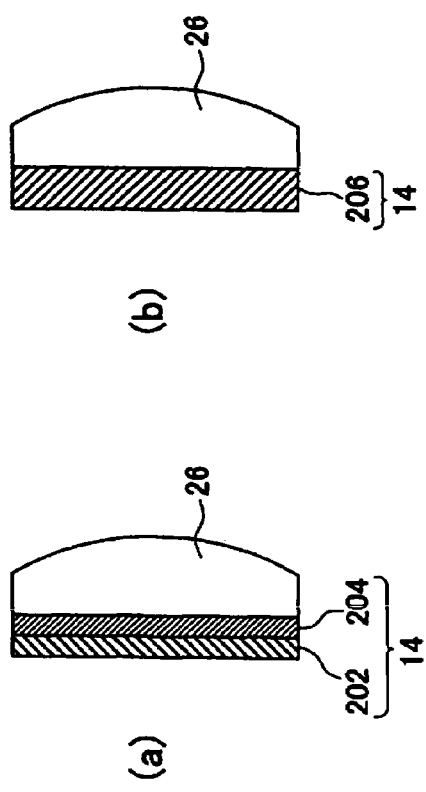
FIG. 3C is a third example of the configuration of the hydrophilic filter 14.

FIG. 3C shows a third embodiment of the configuration of the hydrophilic filter 14. In this configuration, the hydrophilic filter 14 possesses an intermediate layer 208, the photocatalytic layer 204, and the hydrophilic layer 204. The intermediate layer 208, the photocatalytic layer 204, and the hydrophilic layer 204 are formed on the lens 26 on this order. The lens 26 is formed of a material having a refracting ratio smaller than that of the photocatalytic layer 204.

The intermediate layer 208 is a layer formed between the photocatalytic layer 204 and the lens 26, and has a refracting ratio between that of the photocatalytic layer 204 and that of the lens 26. Such a configuration can decrease the reflecting ratio of the photocatalytic layer 204. The decreasing of the reflecting ratio can suppress the generation of interference color. Also the decreasing of the reflecting ratio can suppress the multiple reflecting phenomenon and the generation of ghost. The intermediate layer 208 is formed of a substance such as $SnO_2$, ITO, $Ta_2O_5$, $ZrO_2$, $Al_2O_3$, and $WO_3$. The intermediate layer is preferably formed of an ITO having a prescribed composition. The ITO preferably possesses an Sn content of not less than 10%. By such a configuration, the intermediate layer 208 having a high acid resistance can be formed.

Also, in this configuration can keep the hydrophilic surface clean, thus, keeping the hydrophilicity on the surface of the lens 26. This can, in turn, keep the anti-fog property of the lens 26. In this embodiment, the constitutions other than described above are the same as or similar to the hydrophilic layer 202 and the photocatalytic layer 204.

Figure 3D:
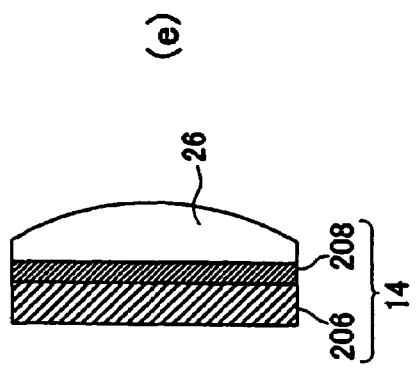
FIG. 3D is a fourth example of the configuration of the hydrophilic filter 14.

FIG. 3D shows a fourth embodiment of the configuration of the hydrophilic filter 14. In this configuration, the hydrophilic filter 14 possesses the intermediate layer 208 and the mixed layer 206. In this configuration, the lens 26 is formed of a material having a refracting ratio smaller than that of the photocatalytic layer 204. The intermediate layer is a layer formed between the photocatalytic layer 204 and the lens 26, and has a refracting ratio between that of the photocatalytic layer 204 and that of the lens 26. The mixed layer is formed on the intermediate layer 208.

Such a configuration can decrease the reflecting ratio of the photocatalytic layer 204. The decreasing of the reflecting ratio can suppress the generation of interference color. Also the decreasing of the reflecting ratio can suppress the multiple reflecting phenomenon and the generation of ghost. In this configuration, by keeping the surface of the lens 26 hydrophilic, the anti-fog property of the lens 26 can be kept. In this embodiment, the intermediate layer 208 is the same layer as or similar layer to the intermediate layer 208 described by using FIG. 3C. The mixed layer 206 is the same layer as or a similar layer to the mixed layer 206 described by using FIG. 3b.

Figure 3E:
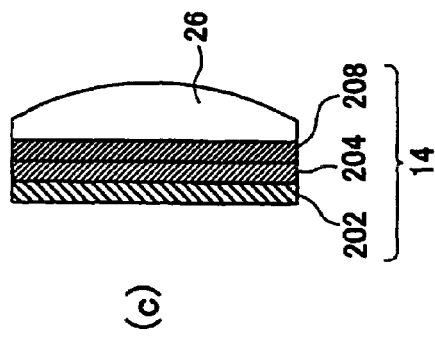
FIG. 3E is a fifth example of the configuration of the hydrophilic filter 14.

FIG. 3E shows a fifth embodiment of the configuration of the hydrophilic filter 14. In this configuration, a transparent substrate 30 used as a hood glass for a lens is utilized as a substrate on which the hydrophilic filter is formed instead of the lens 26. The transparent substrate 30 is formed, for example, of glass, acrylic resin or such. The hydrophilic filter 14 is formed on the transparent substrate 30.

The hydrophilic filter 14 has the configuration same as or similar to that of the hydrophilic filter 14 described by any of FIGS. 3A to 3D except for forming the hydrophilic filter 14 formed on the transparent substrate 30. In this configuration, by keeping the hydrophilicity of the surface of the hood glass covering the lens 26 clean, the anti-fog property of the lens 26 can be kept. In the case where the hydrophilic filter 14 having this configuration is used, the camera 10 (see FIG. 2) possesses a lens, for example, between the transparent substrate 30 and the image pickup portion 24 (see FIG. 2).

As described above, by forming the hydrophilic filter 14 directly on the lens 26 or on the transparent substrate 30, which is the cover lens, the anti-fog property of the lens 26 can be kept. This makes it possible to provide a camera 10 having an anti-fog lens 26 in combination with the ultraviolet light generating portion.

EXAMPLE

An example of the hydrophilic filter 14 will be described. This example is an example of the hydrophilic filter 14 described by using FIG. 3E. The hydrophilic filter 14 has the photocatalytic layer 204 and the hydrophilic layer 202 similar to the hydrophilic filter 14 described by using FIG. 3A.

A soda lime glass substrate having a thickness of 1.8 mm was used as the transparent substrate 30, on which 200 nm thick $TiO_2$ film was formed as the photocatalytic layer 204. On the photocatalytic layer 204 was formed a 20 nm thick $SiO_2$ film was formed as the hydrophilic layer. The transparent substrate 30 on which the photocatalytic layer 204 and the hydrophilic layer 204 were formed was used as a hood glass to produce a camera.

In order to confirm the photocatalytic properties of the photocatalytic layer 204, Black Light FL6BL-B available from Matsushita Electric CO., Ltd. (hereinafter referred to as "UV lamp") was used as a ultraviolet light source, and it was adjusted and placed so that the strength of the ultraviolet light was 1 mw/cm$^2$.

An engine oil was adhered on the hood glass portion, and the surface of the sample was adjusted so that the contact angle of the water droplet became 60 degree. A dark room at which no ultraviolet light except for the ultraviolet light from the UV lamp is irradiated was prepared, and the UV lamp was irradiated. 4 hours after irradiation from the UV lamp, the contact angle of the water droplet was not more than 5 degree, confirming that the photocatalytic layer 204 exhibited the photocatalytic properties by the UV lamp.

From the results, it has been confirmed that in the vehicle rear side camera where the camera is provided downward, even if the strength of the ultraviolet light from the sunlight is decreased, the photocatalytic properties of the photocatalytic layer 204 were exhibited by jointly using the ultraviolet light source, and thus, clear view can be always obtained.

In this example, in order to confirm the photocatalytic properties of the photocatalytic layer 204, the UV lamp described above was used. For example, even when the ultraviolet light is irradiated from the ultraviolet light generating portion 16 described by using FIG. 1 and FIG. 2, the exhibition of the photocatalytic properties of the photocatalytic layer 204 can be confirmed in a similar manner.

Figure 4:
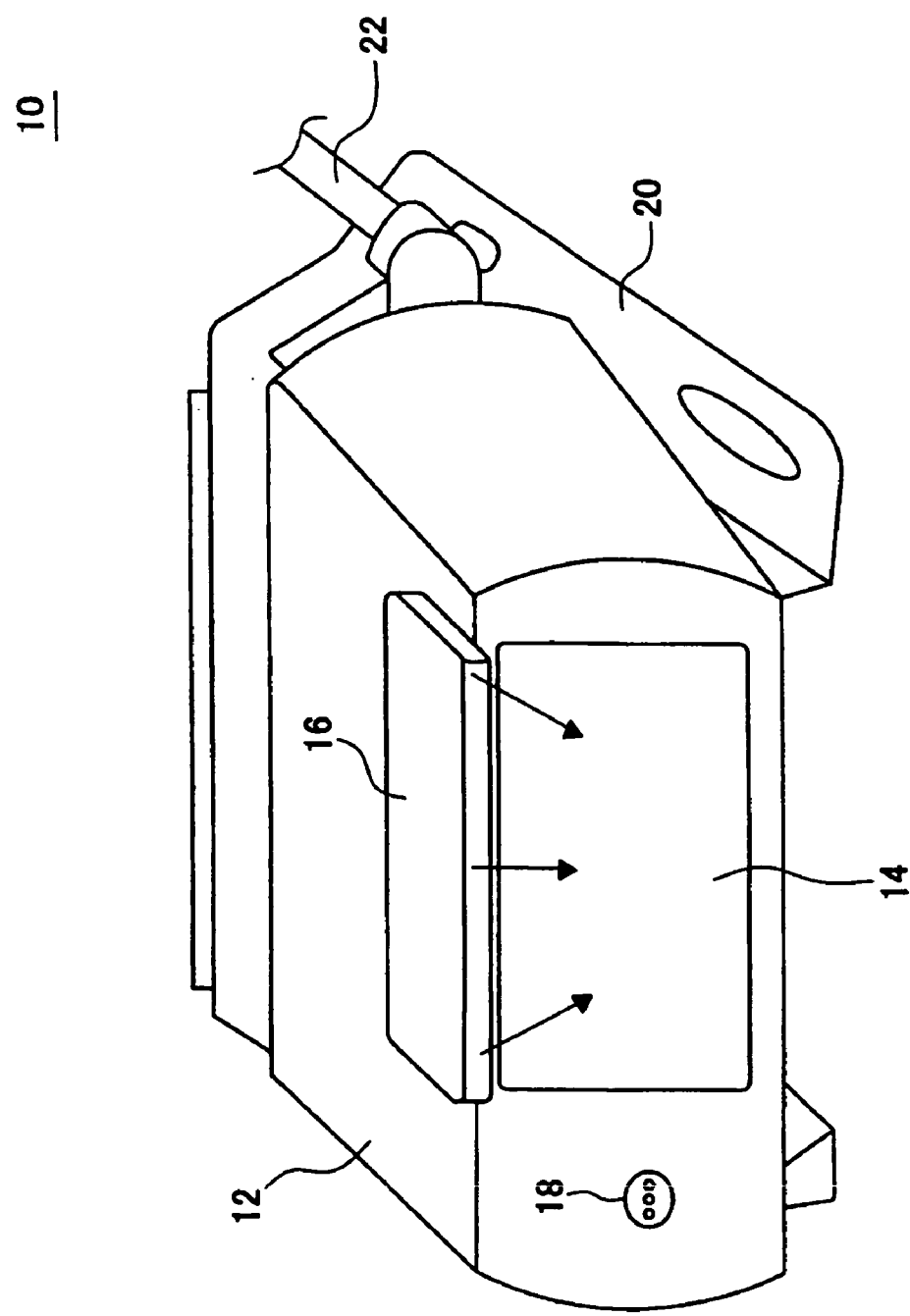
FIG. 4 is a perspective view showing a camera 10 according to a second embodiment of the present invention corresponding to configuration 1 of the present invention.

FIG. 4 is a perspective view showing a camera 10 according to a second embodiment of the present invention corresponding to configuration 1 of the present invention. Except for the following descriptions, since the constitutions assigned by the same symbols as those of FIG. 1 to FIG. 3 have the constitutions same as or similar to those of FIG. 1 to FIG. 3, these descriptions will be omitted.

In this embodiment, the ultraviolet light generating portion 16 is provided outside of the cover case 12 on the edge portion of the hydrophilic filter 14. The ultraviolet light generating portion 16 includes, for example, the light emitting diode or the black light as the ultraviolet light source. The light source irradiates the ultraviolet light from the surface along the edge portion of the hydrophilic filter 14 to the whole surface of the hydrophilic filter 14. Also in this case, the irradiation of the ultraviolet light from the surface along the edge portion of the hydrophilic filter 14 can suppress the influence of the ultraviolet light upon the image to be taken.

Figure 5:
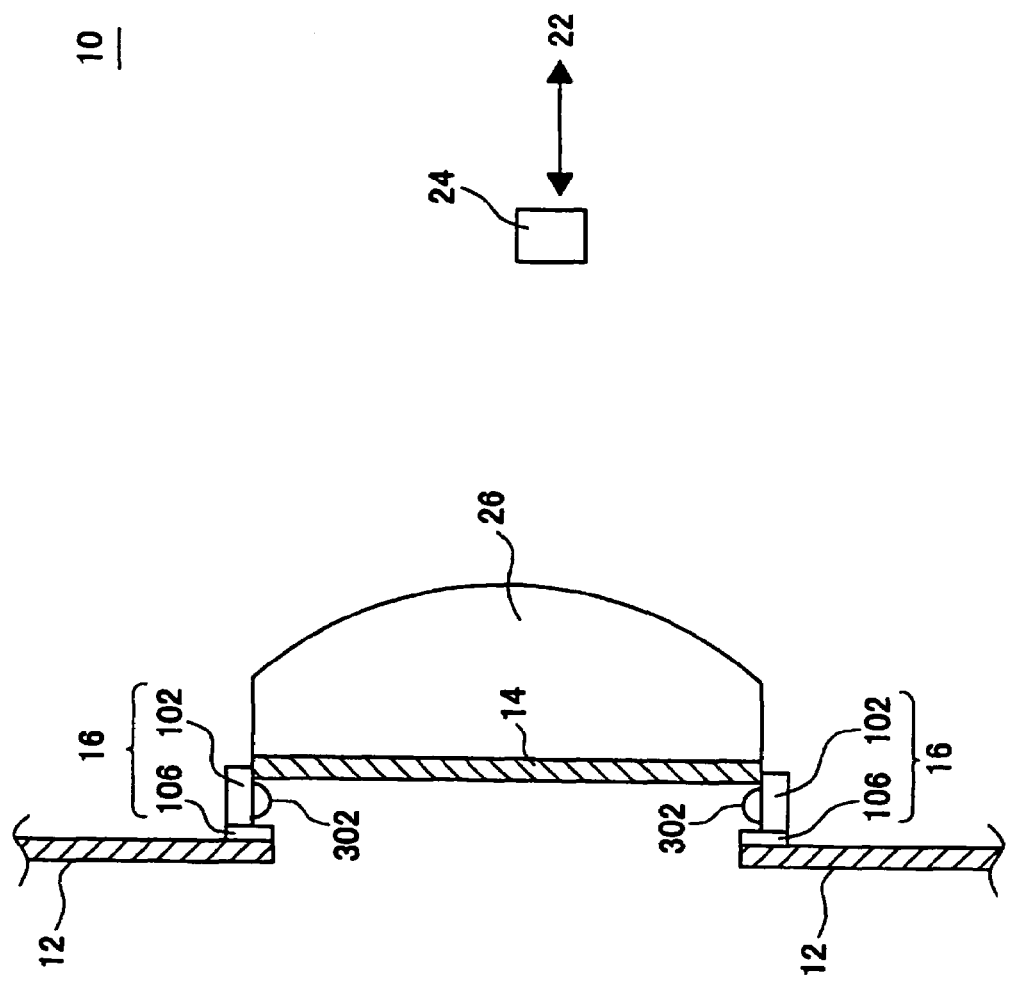
FIG. 5 is a perspective view showing a camera 10 according to one embodiment of the present invention corresponding to configuration 5 of the present invention.

FIG. 5 is a perspective view showing a camera 10 according to one embodiment of the present invention corresponding to configuration 5 of the present invention. Except for the following descriptions, since the constitutions assigned by the same symbols as those of FIG. 1 to FIG. 3 have the constitutions same as or similar to those of FIG. 1 to FIG. 3, these descriptions will be omitted. In this embodiment, the ultraviolet light generating portion 16 possesses the light emitting diode 102 and the reflecting mirror 106. The light emitting diode includes a mold portion 302.

The light emitting diode 102 is provided on the hydrophilic filter 14 so that at least part of the mold portion 302 is exposed on the edge of the hydrophilic filter 14. The reflecting mirror 106 is provided on the edge portion of the hydrophilic filter 14 so that the reflecting mirror faces to the hydrophilic filter 14 across the mold portion 302, and reflects the ultraviolet light generated by the light emitting diode 102 to the hydrophilic filter 14. By such a configuration, the ultraviolet light directly irradiated from the light emitting diode 102 and the ultraviolet light reflected by the reflecting mirror can be effectively irradiated to the surface of the hydrophilic filter 14. Also, in this configuration, irradiation of the ultraviolet light from the edge portion of the hydrophilic layer 14 can suppress the influence of the ultraviolet light upon the image to be taken.

In this embodiment, the portion of the surface of the mold portion 302 exposed to the edge portion of the hydrophilic filter 14 is made hydrophilic. Such a configuration can prevent the residence of the water droplet on the edge portion of the hydrophilic filter 14.

Figure 6:
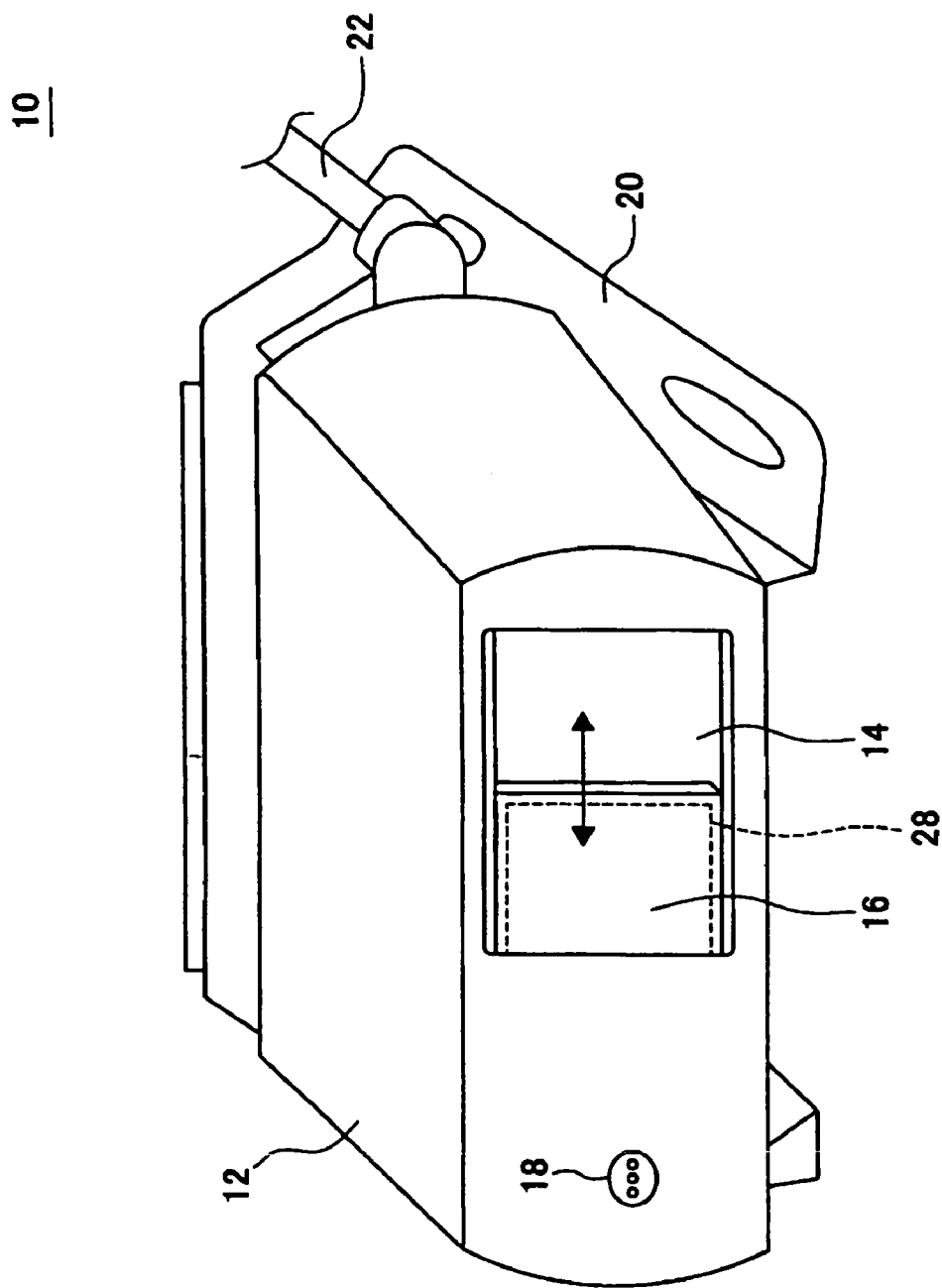
FIG. 6 is a perspective view of a camera 10 according to one embodiment of the present invention corresponding to configuration 6 of the present invention in the state that a cover 28 is opened on the way.
Figure 7:
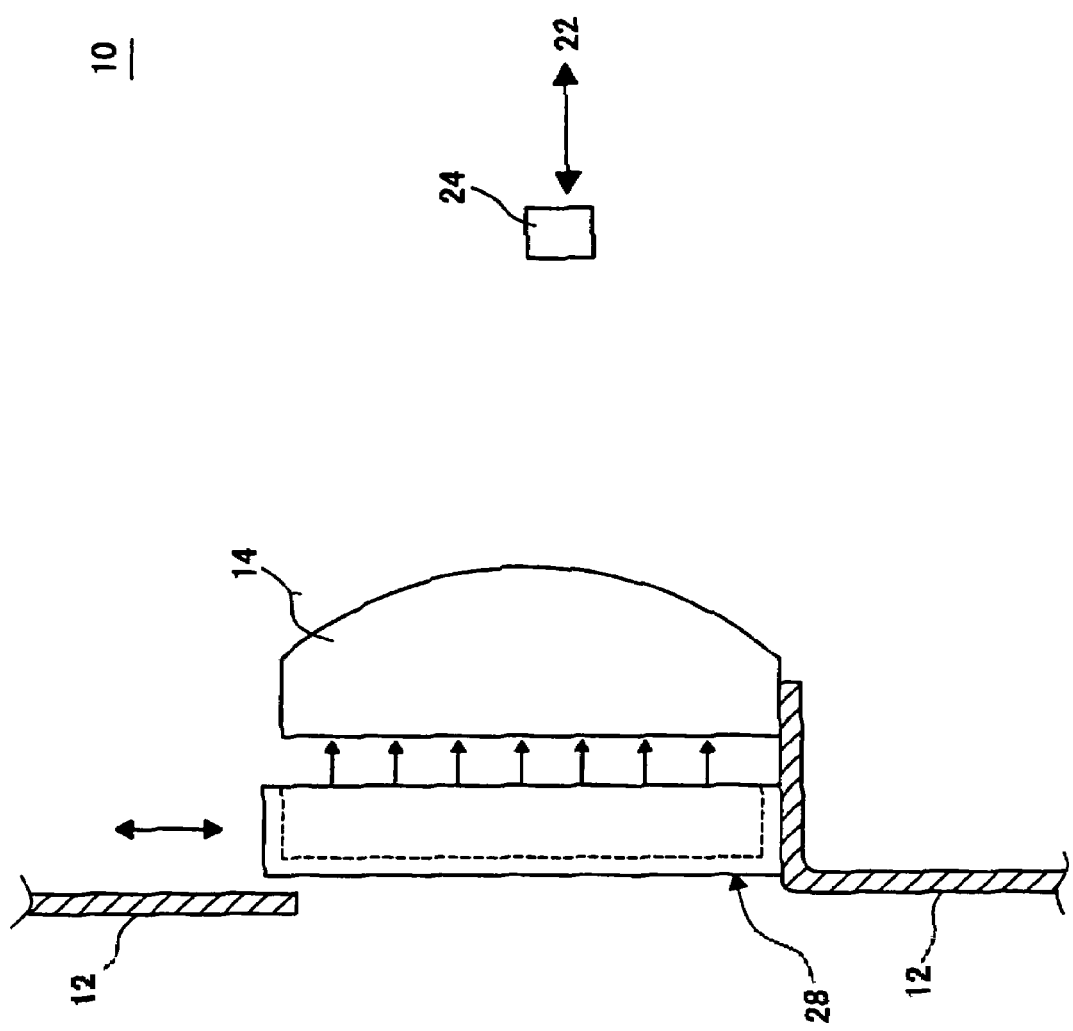
FIG. 7 is a vertically cross-sectional view of the camera 10 in the state that the cover 28 is closed.

FIG. 6 and FIG. 7 show one embodiment of the camera 10. FIG. 6 is a perspective view of a camera 10 in the state that a cover 28 is opened on the way. FIG. 7 is a vertically cross-sectional view of the camera 10 in the state that the cover 28 is closed. Except for the following descriptions, since the constitutions assigned by the same symbols as those of FIG. 1 to FIG. 3 have the constitutions same as or similar to those of FIG. 1 to FIG. 3, these descriptions will be omitted.

In this embodiment, the camera 10 provided on the vehicle further possesses a cover 28 fitted in a manner capable of being opened and closed. The cover 28 covers the hydrophilic filter 14 from the outside of the camera 10 when the image pickup portion 24 does not take an image. The cover 28 is opened, for example, upon starting the engine of the vehicle. The cover 28 is also closed, upon stopping the engine to cover the hydrophilic filter 14. The image pickup portion 24 takes an image during the actuation of the engine.

The ultraviolet light generating portion 16 is provided on the surface of the cover 28 facing to the hydrophilic filter 14, and comprises, for example, the light emitting diode or the black light as the ultraviolet light source. Upon stopping the engine and closing the cover 28, the ultraviolet light generating portion 16 initiate the irradiation of the ultraviolet light. By this configuration, when the cover 28 covers the hydrophilic filter 14, the ultraviolet light generating portion irradiates the ultraviolet light to the surface of the hydrophilic filter 14. The term "surface of the hydrophilic filter 14" intended herein is the surface of hydrophilic filter 4 at the outside of the camera 10. By such a configuration, the ultraviolet light is irradiated over a period when no image is taken, whereby the influence of the ultraviolet light upon the image to be taken can be suppressed.

The ultraviolet light generating portion 16 may generate the ultraviolet light for a prescribed period upon covering the hydrophilic filter 14 with the cover 28 per every stopping the engine and closing the cover 28. By such a configuration, the organic substances adhered on the hydrophilic filter 14 can be decomposed every use of the camera 10.

While embodiments of the present invention have been described, the scope of the present invention is not restricted thereto. Various modifications and alternations may be done by those skilled in the art without departing from the scope and sprits of the present invention. These are included in the scope of the present invention.

According to the present invention, the camera of the present invention is applicable to the camera used in the environments where the sunlight is exposed only with difficulty such as the vehicle rear side camera.

What is claimed is:

1. A camera for taking an image possessing:
   an image-pickup portion which takes an image of a subject;
   a hydrophilic filter which is formed so that a hydrophilic surface is exposed on an outer surface of said camera, and which transmits a light entering from the subject to said image-pickup portion; and
   a ultraviolet light generating portion, which irradiates an ultraviolet light to the surface of the external surface of said camera on said hydrophilic filter from the edge portion of said hydrophilic filter; and said hydrophilic filter comprising a photocatalytic substance which decomposes organic substances adhered thereon due to the ultraviolet light.

2. The camera according to claim 1, wherein said ultraviolet light generating portion possesses a light emitting diode.

3. The camera according to claim 2, wherein said ultraviolet light generating portion further possesses a reflecting mirror provided along at least edge portion of said hydrophilic filter, and wherein said reflecting mirror reflects the ultraviolet light from said light emitting diode to irradiate the ultraviolet light to said hydrophilic filter.

4. The camera according to claim 3, wherein said ultraviolet light generating portion further possesses an external circumferential member made of a transparent material provided at least along the edge portion of said hydrophilic filter, said reflecting mirror irradiates the ultraviolet light to said hydrophilic filter via said external circumferential member, and said portion exposed of the surface of external circumferential member on the edge portion of said hydrophilic filter at the outer surface is made hydrophilic.

5. The camera according to claim 2, wherein said light emitting diode comprises a mold portion at least partially exposed on the edge portion of said hydrophilic filter, and said portion of the surface of the mold portion exposed to the edge portion of said hydrophilic filter is made hydrophilic.

6. A vehicle rear side camera comprising the camera according to claim 1, mounted so that said hydrophilic filter is directed downward.

7. A camera for taking an image possessing:

a image-pickup portion which takes an image of a subject;

a hydrophilic filter which is formed so that a hydrophilic surface is exposed on an outer surface of said camera, and which transmits a light entering from the subject to said image-pickup portion;

a cover for covering said hydrophilic filter from the external surface side of said camera, when said image-pickup portion does not take an image, and a ultraviolet light generating portion which is provided at a surface facing said hydrophilic filter of said cover, and which irradiates a ultraviolet light towards the external surface side of said camera when said cover covers said hydrophilic filter; and said hydrophilic filter comprising a photocatalytic substance decomposing organic substances adhered thereon due to the ultraviolet light.

8. The camera according to claim 7, which is provided on a vehicle, and wherein said cover covers said hydrophilic filter upon stopping the engine of said vehicle, and said ultraviolet light generating portion generates a ultraviolet light for a prescribed period of time upon covering the said hydrophilic filter with said cover.

9. A vehicle rear side camera comprising the camera according to claim 7 mounted so that said hydrophilic filter is directed downward.

10. The camera according to claim 1 or 7, wherein said hydrophilic filter is formed on a substrate, which is one of a transparent substrate or lens for said camera, said substrate is made of a material having a refracting ratio smaller than the layer comprising a photocatalytic substance of said hydrophilic filter, and said hydrophilic filter further possesses an intermediate layer having a refracting ratio between a layer comprising a photocatalytic substance and said substrate formed between a layer comprising a photocatalytic substance and said substrate.

11. The camera according to claim 1 or 7, further comprising a filter for cutting an ultraviolet between the hydrophilic filter and the image-pickup portion.

12. The camera according to claim 1 or 7, wherein said ultraviolet light generating portion irradiates the ultraviolet over the entire portions of the hydrophilic filter in a uniform manner.

13. The camera according to claim 1 or 7, wherein said ultraviolet light generating portion possesses a filter for cutting visible lights.

14. The camera according to claim 1 or 7, wherein said ultraviolet light generating portion possesses a light-guide plate.

* * * * *